Oct. 11, 1955     H. BLOCH     2,720,599
MAGNETOSTRICTIVE OSCILLATOR
Filed June 7, 1954
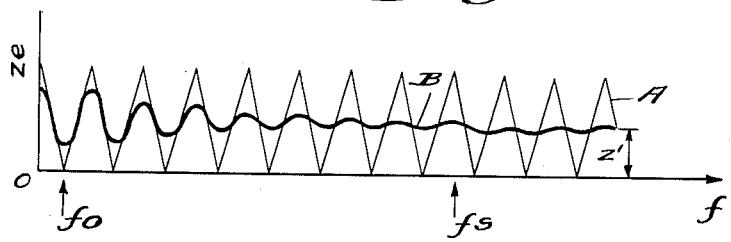
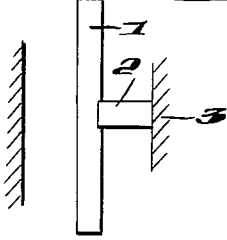
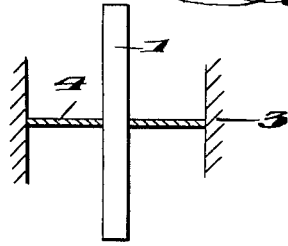
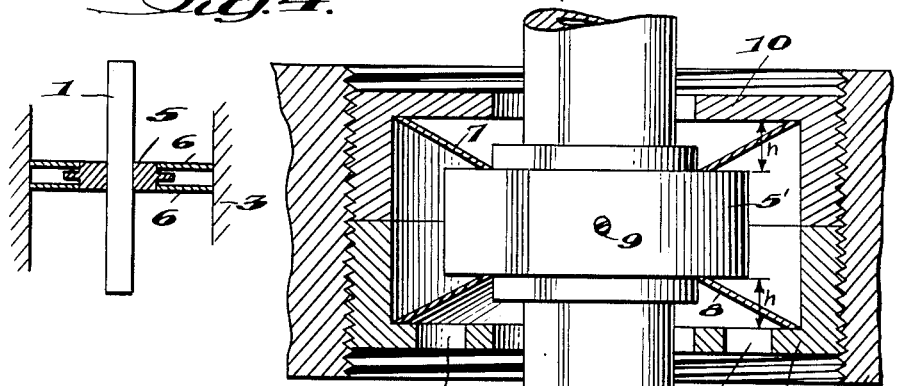
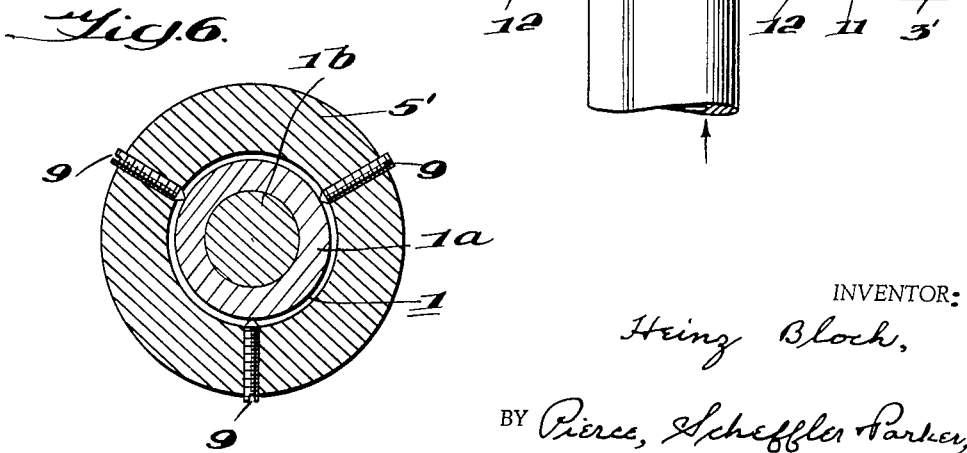
INVENTOR:
Heinz Bloch,
BY Pierce, Scheffler Parker,
ATTORNEYS.

United States Patent Office 2,720,599
Patented Oct. 11, 1955

2,720,599

MAGNETOSTRICTIVE OSCILLATOR

Heinz Bloch, Nussbaumen, Switzerland, assignor to "Patelhold" Patentverwertungs- & Elektro-Holding A.-G., Glarus, Switzerland Application June 7, 1954, Serial No. 434,999

Claims priority, application Switzerland June 15, 1953

6 Claims. (Cl. 310—26)

This invention relates to a magnetostrictive oscillator and more particularly to a center mounting for the longitudinally oscillating bar of the oscillator.

A known design of magnetostrictive oscillator includes the combination with a longitudinally oscillating bar supported at its center and having its ends within excitation coils, of a device for premagnetization of the bar. My prior Patent No. 2,607,814, granted August 19, 1952, describes an oscillator of this type in which the center of the bar is supported in the center of an oscillatory disk which, in turn, is fixed at its rim.

If the oscillations of the bar were loss-free and if no energy were transferred from one end of the bar to the other, the bar center would be motionless. Actually, however, transfer of energy along the bar is desired and losses occur in the bar itself. Consequently, the bar center does not remain at rest but its support must hold the bar immovable transverse to its axis to prevent it from following the premagnetization forces and from coming in contact with other parts, for example the coils, of the assembly.

In the prior constructions, the oscillatory frequency of the mounting disk was to coincide with the working frequency, or a harmonic of the working frequency, of the oscillating bar but it was found that this condition frequently could be attained only by time-consuming operations.

Objects of the present invention are to provide magnetostrictive oscillators with center mountings for the oscillating bar which are free from the disadvantages of the prior devices. Objects are to provide magnetostrictive oscillators in which a longitudinally oscillating bar is supported by an oscillating carrier whose fundamental frequency of mechanical oscillation is so far below the working frequency of the bar that it does not materially affect the freedom of movement of the bar center in a longitudinal direction. More particularly, objects are to provide magnetostrictive oscillators of the centrally-supported bar type in which the oscillatory carrier for the bar has a characteristic frequency that is small in comparison with the working frequency of the oscillating bar and a damping so great that the differences between the maxima and the minima of the mechanical impedances of the oscillatory carrier are negligibly small in the region of the working frequency.

These and other objects and the advantages of the invention will be apparent from the following specification when taken with the accompanying drawings, in which:

Fig. 1 is a curve sheet showing the variation with frequency of the mechanical impedance of an oscillatory bar carrier contemplated by the invention;

Figs. 2, 3 and 4 are schematic sectional views through different embodiments of the invention;

Fig. 5 is a fragmentary central section through a construction embodiment of the invention; and Fig. 6 is a transverse section through the oscillating bar and intermediate mounting member of Fig. 5.

In Fig. 1, the light line curve A shows the variation with frequency $f$ of the mechanical impedance $Z_e$ of the carrier which is to support the center of the longitudinally oscillating bar. The fundamental characteristic frequency $f_0$ of mechanical oscillation of the carrier is small in comparison with the working frequency $f_s$ of the oscillator and, if the carrier is suitably damped, the mechanical impedance of the carrier does not vary widely between maximum and minimum values but varies with frequency according to heavy line curve B and approaches a limiting value $Z'$ which is small in comparison with the mechanical oscillatory impedance of the magnetostrictive bar thereby permitting freedom of movement of the bar center in a longitudinal direction. It will be noted that the mechanical impedance of the carrier becomes smaller in the range of the higher harmonics of its characteristic frequency $f_0$ and that the exact position of the oscillator working frequency $f_s$ therefore is not critical.

For simplicity, the coils and premagnetization elements of the magnetostrictive oscillator are not shown in Figs. 3–5 since they may be of any known or desired construction, for example as shown in my prior patent, without affecting the carrier support of the center of the oscillatory bar 1 which is the subject matter of this invention.

As shown schematically in Fig. 2, a longitudinally oscillating bar 1 of circular cross-section is supported at its midpoint by one end of a resilient cantilever rod member 2 which has its other end rigidly secured to a fixed part 3 of the supporting frame of the oscillator. The member 2 has a natural frequency of oscillation $f_0$ which is small in comparison with the working frequency $f_s$ of the oscillator and it may be of beryllium-bronze as the internal friction of that material provides a high damping which makes the effective mechanical impedance of the carrier negligibly small with respect to the mechanical oscillatory impedance of the bar 1 at the working frequency $f_s$. If the carrier 2 is not of beryllium-bronze or an equivalent self-damping material, additional damping may be provided in known ways.

As shown in Fig. 3, the midpoint of the bar 1 may be secured to the center of a disk 4 having its rim anchored to the supporting frame 3. While this construction is similar to that disclosed in my prior patent, it is to be noted that the mechanical properties of the carrier disk 4 differ from those of the prior device in that the fundamental characteristic frequency of the carrier disk 4 does not coincide with the working frequency, or a harmonic of the working frequency of the oscillating bar 1 but is purposely made much smaller than the working frequency, and the carrier disk 4 is so damped, by selection of the material and/or by additional damping that its mechanical impedance at the working frequency does not interfere with the desired longitudinal movement of the midpoint of the bar 1.

As shown in Fig. 4, an intermediate member 5 is rigidly fixed to the midpoint of bar 1 and parallel annular spring members 6 secure the member 5 to the frame 3.

A structural embodiment similar to Fig. 4 but employing frusto-conical beryllium-bronze springs 7, 8 in place of annular springs is shown in Fig. 5. The intermediate member 5' has the form of a ring with reduced diameter ends which is secured to the middle of the oscillating bar 1 by a plurality, preferably three uniformly spaced, set screws 9 with conventional pointed ends engaging the bar 1. The central openings of the springs 7 and 8 are of a size to fit snugly over the reduced diameter ends of the ring 5', and the springs flare away from each other and have their outer edges seated against the juncture of the radial and circumferential walls of upper and lower bushings 10, 11 respectively which are threaded into a frame member 3'. The lower bushing 11 is provided with spaced openings 12 into which an end wrench may be inserted for tightening the bushing 11 against the bushing 10. The bushings are so dimensioned with respect to the axial length of the thickened portion of ring 5' that, when assembled as shown in Fig. 5, the axial distances $h$ between the seats for the inner edges of the springs 7, 8 on ring 5' and the seats for the outer edges on bushings 10, 11 respectively are shorter than the unstressed axial lengths of the conical springs by a small value, say of the order of 0.1 millimeter, whereby the springs 7, 8 are tightly clamped between the intermediate member 5' and the bushings 10, 11 and the center of the bar 1 is secured against transverse movement but has freedom for longitudinal movement. In practical embodiments of the oscillator, the outside diameter of the bushings 10, 11 may be about 8 millimeters.

The oscillatory bar 1 preferably comprises a thin layer of magnetostrictive material $1a$ on a core $1b$ of a material whose properties are substantially constant over a wide temperature range, for example, "Nivarox," which is an alloy of nickel, chromium, cobalt, tungsten and beryllium, see Fig. 6.

I claim:

1. A magnetostrictive oscillator of the type including a longitudinally oscillating bar, a frame, and carrier means secured to the midpoint of said bar to mount the same upon said frame; characterized by the fact that said carrier means has a fundamental characteristic frequency of oscillation that is small in comparison with the working frequency of the oscillator and a damping of a magnitude which makes the differences between the maximum and minimum of the mechanical impedance of said carrier means negligibly small at the working frequency thereby to permit freedom of movment of the mid-point of said bar in a longitudinal direction.

2. A magnetostrictive oscillator as recited in claim 1, wherein said carrier means comprises a cantilever rod member having its ends secured respectively to the midpoint of said bar and to said frame.

3. A magnetostrictive oscillator as recited in claim 1, wherein said carrier means comprises a disk.

4. A magnetostrictive oscillator as recited in claim 1, wherein said carrier means comprises an intermediate member rigidly secured to the midpoint of said bar and resilient means mounting said intermediate member upon said frame.

5. A magnetostrictive oscillator as recited in claim 4, wherein said resilient means comprises a plurality of annular springs.

6. A magnetostrictive oscillator as recited in claim 4, wherein said resilient means comprises a plurality of frusto-conical springs.

References Cited in the file of this patent

UNITED STATES PATENTS

| Number | Name | Date |
|---|---|---|
| 1,750,124 | Pierce | Mar. 11, 1930 |
| 2,580,716 | Balamuth | Jan. 1, 1952 |
| 2,596,226 | Eldridge | May 13, 1952 |
| 2,607,814 | Bloch | Aug. 19, 1952 |
| 2,651,148 | Carwile | Sept. 8, 1953 |